(12) United States Patent
Boyd et al.

(10) Patent No.: US 10,176,722 B1
(45) Date of Patent: Jan. 8, 2019

(54) LOCATION MARKER WITH LIGHTS

(71) Applicant: Amazon Technologies, Inc., Seattle, WA (US)

(72) Inventors: Scott Patrick Boyd, Seattle, WA (US); Chengwu Cui, Redmond, WA (US); Sarah Graber, Seattle, WA (US); Barry James O'Brien, Seattle, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/250,806

(22) Filed: Aug. 29, 2016

(51) Int. Cl.
| | | |
|---|---|---|
| *G08G 5/02* | (2006.01) | |
| *H05B 37/02* | (2006.01) | |
| *G08G 5/00* | (2006.01) | |
| *B64C 39/02* | (2006.01) | |
| *B64F 1/20* | (2006.01) | |
| *G05D 1/00* | (2006.01) | |

(52) U.S. Cl.
CPC .......... *G08G 5/025* (2013.01); *B64C 39/024* (2013.01); *B64F 1/20* (2013.01); *G05D 1/0022* (2013.01); *G08G 5/0069* (2013.01); *H05B 37/0227* (2013.01); *H05B 37/0272* (2013.01)

(58) Field of Classification Search
CPC ..... B64F 1/20; B64C 39/024; B64C 2201/18; G08G 5/025; G08G 5/0069; H05B 37/0227; H05B 37/0272; H05B 37/0236; G05D 1/0022
USPC ....... 340/321, 331, 539.13, 815.4, 948, 953; 362/183, 237
See application file for complete search history.

(56) References Cited

U.S. PATENT DOCUMENTS

| | | | | |
|---|---|---|---|---|
| 5,515,974 | A * | 5/1996 | Higson | A61F 17/00 206/223 |
| 7,391,340 | B2 * | 6/2008 | Malhomme | B64F 1/007 244/110 E |
| 9,592,912 | B1 * | 3/2017 | Michini | G01C 15/02 |
| 9,616,350 | B2 | 4/2017 | Stenzler et al. | |
| 9,648,672 | B2 * | 5/2017 | Chien | H05B 33/08 |
| 9,656,749 | B1 * | 5/2017 | Hanlon | B64C 39/024 |

(Continued)

OTHER PUBLICATIONS

Office Action for U.S. Appl. No. 15/250,778, dated Oct. 20, 2017, Boyd, "Location Marker With Retroreflectors", 18 pages.

*Primary Examiner* — Hung T Nguyen
(74) *Attorney, Agent, or Firm* — Lee & Hayes, P.C.

(57) ABSTRACT

A location marker that may be used to provide information to a vehicle, such as an unmanned aerial vehicle (UAV). The location marker may include a plurality of lights that may be individually sequenced on and off at different times to create a time domain signal sequence that is readable by the vehicle. The lights may provide information in various different ways. The specific lights that are illuminated at a certain time may form a light pattern that includes or is associated with information. Different light patterns may be displayed over time to provide different information to the vehicle. In some embodiments, the amount of time that a light is on or off (or both) may provide information as a time domain signal sequence (e.g., flashing lights) to the vehicle. In various embodiments, the location marker may include retroreflectors arranged in a pattern used to identify the location marker.

20 Claims, 11 Drawing Sheets

(56) References Cited

U.S. PATENT DOCUMENTS

| | | |
|---|---|---|
| 9,769,387 B1 | 9/2017 | Beard et al. |
| 2003/0103210 A1 | 6/2003 | Rapp et al. |
| 2006/0257205 A1* | 11/2006 | Jordan .................... E01F 9/559 404/16 |
| 2012/0140224 A1 | 6/2012 | Switkes et al. |
| 2013/0278635 A1* | 10/2013 | Maggiore ............. G06T 19/006 345/633 |
| 2014/0063055 A1* | 3/2014 | Osterhout ............... G06F 3/005 345/633 |
| 2015/0084791 A1* | 3/2015 | Jang ........................ G08G 1/07 340/944 |
| 2015/0212243 A1 | 7/2015 | Oldknow |
| 2015/0339920 A1 | 11/2015 | Cortelyou et al. |
| 2016/0039540 A1* | 2/2016 | Wang ....................... B64F 1/36 244/114 R |
| 2016/0122038 A1* | 5/2016 | Fleischman ............... G06T 7/73 701/2 |
| 2016/0257424 A1* | 9/2016 | Stabler ................... A63H 27/12 |
| 2017/0045894 A1* | 2/2017 | Canoy .................... G05D 1/101 |
| 2017/0213062 A1* | 7/2017 | Jones .................... G06K 7/1417 |
| 2017/0219676 A1 | 8/2017 | Tran et al. |
| 2017/0228692 A1 | 8/2017 | Pargoe |

\* cited by examiner

LOCATION MARKER WITH LIGHTS

BACKGROUND

Currently, a majority of deliveries are conducted manually by delivery personnel going door-to-door. However, the unmanned aerial vehicle (UAV) has great potential as an expedient and energy efficient vehicle for delivering goods to consumers. For example, after processing an order for a product, a UAV may transport the product to a delivery location, such as a consumer's home or office. The UAV may fly autonomously at times and may navigate to an assigned destination. Often, UAVs rely on a global positioning system (GPS) for navigation. However, GPS is subject to some errors and inaccuracy, and may not afford a UAV accuracy needed to discriminate a correct delivery location from an incorrect delivery location, especially when delivery locations are very close together, such as within feet of one another.

Landing markers are sometimes used to guide a vehicle to a specific landing zone. Often, landing markers are permanent fixtures that are painted on a landing pad. These landing markers take up physical space, are visually unattractive in typical residential areas, and are not always visible at night or in inclement weather.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
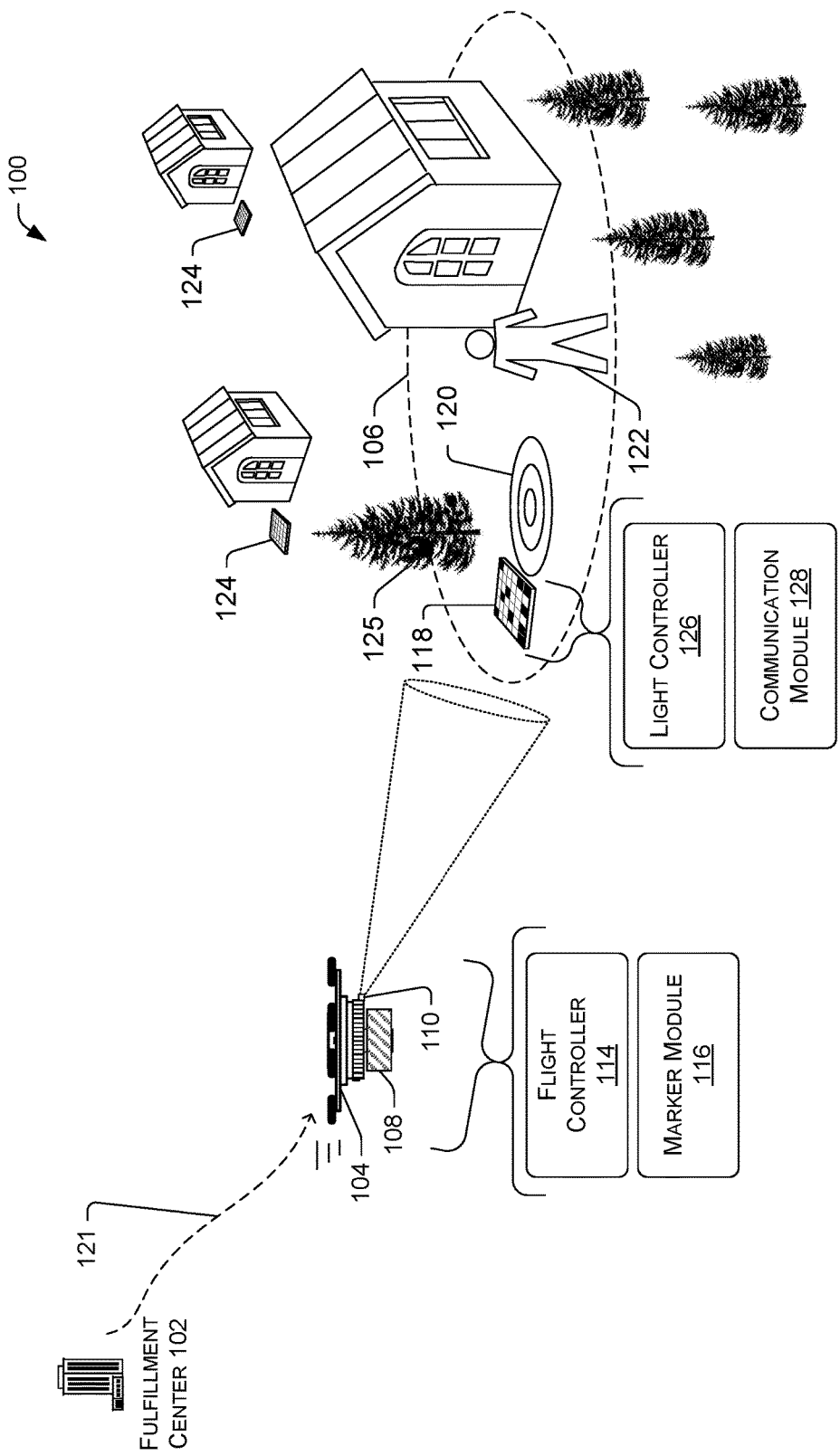
FIG. 1 is a schematic diagram of an illustrative environment that includes a location marker with lights configured to visually identify a location for an unmanned aerial vehicle (UAV).

This disclosure is directed to a location marker that may be used to provide information to a vehicle, such as an unmanned aerial vehicle (UAV). In some embodiments, the location marker may include a plurality of lights which may be individually sequenced on and off at different times to create a time domain signal sequence that is readable by the vehicle. The lights may provide information in various different ways. For example, the specific lights that are illuminated at a certain time may form a light pattern that includes or is associated with information. For example, lights may be illuminated to create a light pattern, such as a quick response (QR) code or other image code, which can be deciphered by a computing device associated with the vehicle. Different light patterns may be displayed over time to provide different information to the vehicle.

In some embodiments, the amount of time that a light is on or off (or both) may provide information as a time domain signal sequence (e.g., flashing lights) to the vehicle, such as to provide information such as an SOS signal or other information (e.g., a unique identifier of a location, etc.). By encoding information into flashing or sequenced lights, the signal may be more easily received and read by a computing device even when the imagery is blurry or otherwise includes distortion or poor quality due to inclement weather and/or for other reasons. In various embodiments, both the time domain signal sequence and the light pattern that is illuminated may be used to provide information to the vehicle. For example, the time domain signal sequence may provide identification information to identify a specific location while the light pattern may provide approach information, indicate obstacles to avoid, and/or provide other information to the vehicle.

In various embodiments, the location marker may monitor an area proximate to the location marker to detect presence of obstacles such as people, animals, and/or other living or non-living objects that may disrupt a successful delivery of an item by a vehicle. Upon detection of such obstacles, the location marker may initiate a light control to indicate the presence of the obstacle(s) to the vehicle, possibly as an "abort" message to inform the vehicle to stay clear of the location at least for a certain amount of time.

In accordance with some embodiments, the location marker may include one or more retroreflectors that may reflect light from a light source to an image sensor onboard the vehicle. The light source may be the sun, a light onboard the vehicle, a laser onboard the vehicle, and/or another light source. The retroreflectors may be used with different shapes, configured in different patterns, and/or be used with other displays or lights to provide information to the vehicle. Unlike the lights described above, the retroreflectors typically cannot "turn on" and "turn off", and thus cannot provide a time domain signal sequence. However, the retroreflectors may be placed in certain locations to enable conveying information to a vehicle, such as a UAV. The retroreflectors may also provide directionality information based on various configurations described below.

The vehicle may be autonomous or semi-autonomous and may be an aerial vehicle, a land-based vehicle, and/or a maritime vessel. The techniques, apparatuses, and systems described herein may be implemented in a number of ways. Example implementations are provided below with reference to the following figures.

FIG. 1 is a schematic diagram of an illustrative environment 100 that includes a location marker with lights configured to visually identify a location for an unmanned aerial vehicle (UAV). The environment 100 includes a fulfillment center (FC) 102 where a UAV 104 may originate a flight directed to a destination 106, such as a location associated with a recipient of a package 108 transported by the UAV 104.

The UAV 104 may be equipped with one or more image sensors 110 used to detect visible light or non-visible light (e.g., infrared light, etc.). The image sensor(s) 110 may include cameras, such as a stereo camera pair used for guidance purposes by the UAV 104. The image sensor(s) 110 may capture imagery of a location that includes a location marker, and may enable detection of the location marker and possible extraction of information from the location marker, as discussed below.

The UAV may be equipped with a number of components to enable the UAV 104 to perform operations during the delivery of the package and to identify and extract information from a location marker. The components may include at least a flight controller 114 and a marker module 116. The UAV 104 may travel under control of the flight controller 114 and along a flight path 121 toward the destination 106. The flight controller 114 may continually or from time to time provide controls to cause change in a velocity of the UAV, a change in heading, a change in altitude, a change in orientation, and/or other changes (e.g., pitch, roll, yaw, hover, etc.). In addition, the UAV 104 may execute different controls based on different flight scenarios, such as a takeoff stage, a transport stage, a package deposit stage, and/or a landing stage of flight.

The marker module 116 may detect a location marker 118 via analysis of imagery that includes the location marker 118 and/or may interpret information from the location marker 118. The location marker 118 may be associated with a specific location 120, such as a physical location to deposit the package 108. However, the location may be associated with other information, such as a waypoint for navigation, an obstacle 125, a location for an autonomous vehicle (or taxi) to pick up passengers, and so forth. The location marker 118 may include lights that turn on and off individually to provide information as a time domain signal sequence and/or may provide a light pattern readable by the marker module 116. The marker module 116, via analysis of the imagery of the location marker 118, may determine an identifier associated with the location marker 118, which may be associated with a recipient 122 of the package 108. In some embodiments, the identifier may be a location identifier. The location identifier may be a unique code, a physical address (e.g., a street address, a house number, etc.), a customer identifier, and/or other location information (e.g., coordinates, etc.). The identifier may be input to the location marker by a wireless message, by input controls on the device, by being hardcoded on the location marker, and/or via other known techniques, such as by plugging in a device to a port on the location marker.

For example, the recipient 122 may be assigned an identifier, which is emitted via lights by the location marker 118, to inform the UAV 104 of a specific location associated with the recipient 122. The location may be the location of a home or other dwelling, or the location may be associated with a place of presence of the recipient 122 at a given time or period of time. For example, a person may bring the location marker 118 to a park or other public space, such as where the person is having a picnic during the afternoon. The location marker 118 may enable a UAV or other vehicle to locate the person. Thus, the location marker 118 may be portable and may be associated with different locations, as discussed in greater detail below. The identifier emitted by the location marker 118 may be different from identifiers emitted by other location markers 124, but may not be unique among all location markers.

In some embodiments, the information provided by the location marker 118 to the marker module 116, via a light pattern and/or a time domain signal sequence, may provide the identifier and/or other messages such as indication of a preferred approach and/or departure to a location, presence of obstacles 125, information about the recipient 122, and/or other information. For example, the light pattern may identify specific information to assist the UAV 104 in successfully depositing the package 108, including how to deposit the package (e.g., landing, dropping from the air, etc.), and/or other instructions, messages, or information.

The location marker 118 may be equipped with a number of components to enable the location marker to perform operations to assist with the delivery of the package 108. The components may include at least a light controller 126 and a communication module 128, as well as other components discussed below with reference to FIG. 2.

The light controller 126 may cause lights of the location marker 118 to turn on and off to create a time domain signal sequence and/or a light pattern as described above. The light controller 126 may determine the information to provide to the UAV 104, and may convert that information into the time domain signal sequence and/or the light pattern. In some embodiments, the light controller 126 may sense a wake signal or other occurrence, which may cause the light controller 126 to activate the lights (e.g., change from a low power state to a full operation state, etc.). For example, the light controller 126 may "hear" the UAV 104, and/or capture other signals from the UAV 104, which may be used to wake the location marker 118. The low power state may be used to conserve power when the location marker 118 is not expected to be used by the UAV 104. The light controller 126 may provide initiation sequences or other sequences of lights to provide information such as an indication of an identifier, a message, a warning, an abort signal, and so forth. For example, the light controller 126 may insert predetermined sequences of the time domain signal sequence and/or the light patterns prior to different types of information to signal to the UAV 104 which information will be provided next via the light controller 126. The light controller 126 may obtain information and/or communicate with the communication module 128, which is described next.

The communication module 128 may be configured to exchange information with other devices, such as a device of a person (e.g., mobile phone, computer, etc.), a command center associated with the UAV 104, a third party device, and/or other devices. For example, the communication module 128 may obtain the identifier to be used by the light controller 126, may obtain a message to be emitted by the light controller 126, and so forth. In some embodiments, the recipient 122 (or possibly a central command associated with the fulfillment center 102) may program or otherwise cause specific operation of the location marker 118 via interaction with the communication module 128, such as through an application operating on a device. For example, the recipient 122 may disable the location marker 118, such as after use of the location marker or as a result of theft of the location marker via the communication module 128. The recipient 122 may turn the location marker on/off via the communication module 128.

Figure 2:
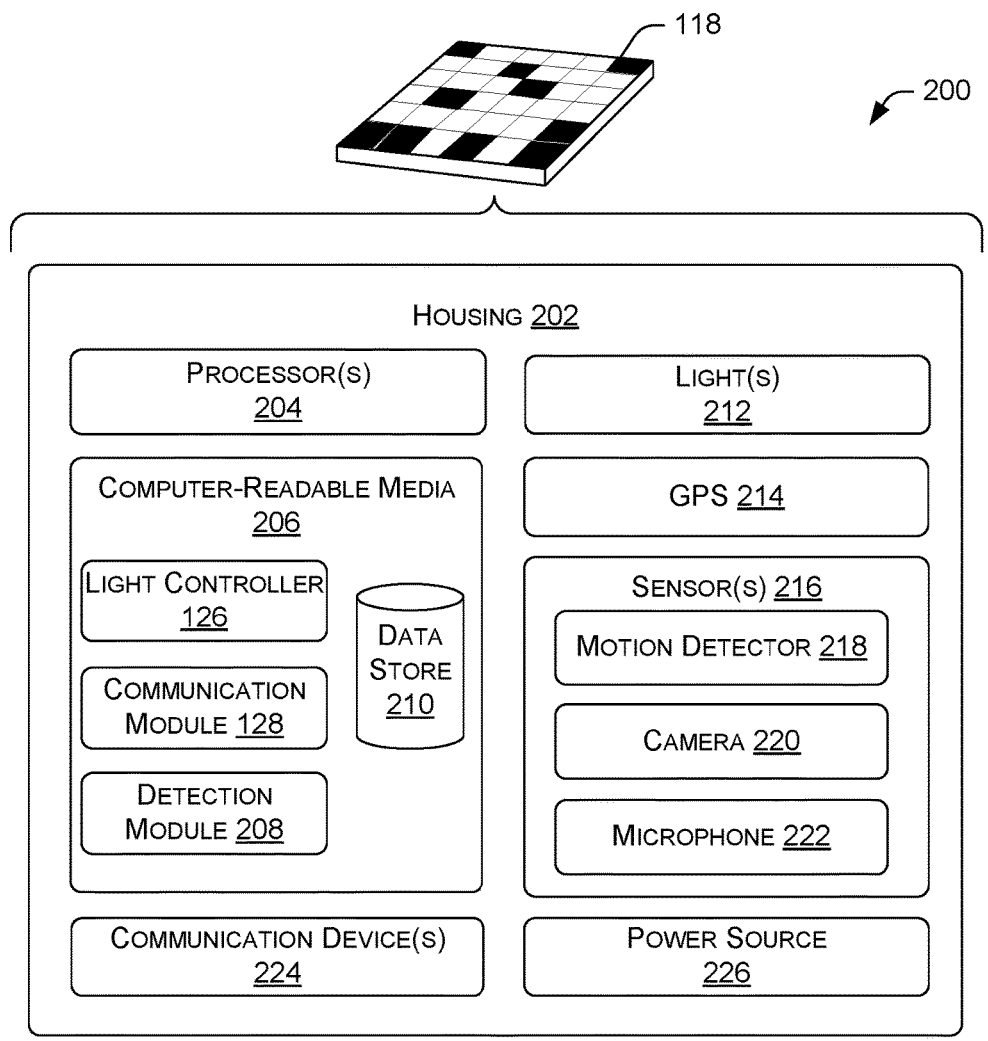
FIG. 2 is a block diagram of illustrative architecture of the location marker with lights shown in FIG. 1.

FIG. 2 is a block diagram of illustrative architecture 200 of the location marker with lights shown in FIG. 1. The location marker 118 may include a housing 202, which may be relatively flat or may have another shape, such as a cylinder, pyramid, cube, or other symmetrical or non-symmetrical volume. The location marker 118 may include one or more processor(s) 204 operably connected to computer-readable media 206. In some examples, the processor(s) 204 may be operably coupled to the computer-readable media 206 via one or more of a system bus, a data bus, an address bus, a PCI bus, a Mini-PCI bus, and any variety of local, peripheral and/or independent busses. Executable instructions stored on the computer-readable media 206 can include an operating system, the light controller 126, the communication module 128, a detection module 208, and other modules and programs that are loadable and executable by the one or more processor(s) 204. Examples of such programs or modules include, but are not limited to sensor algorithms, approach path analysis algorithms, network connection software, and control modules. In some examples, computer-readable media 206 can also include a data store 210 to store customer data (e.g., customer identification, customer preference data, etc.), location data and the like.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. Embodiments may be provided as a computer program product including a non-transitory machine-readable storage medium having stored thereon instructions (in compressed or uncompressed form) that may be used to program a computer (or other electronic device) to perform processes or methods described herein. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The location marker 118 may include light(s) 212, which may be a single light, an array of lights, a grid of lights, and/or other configuration of lights that may be individually turned on and off to create a light pattern and/or to provide a time domain signal sequence. The light(s) 212 may be controlled by the light controller 126 to provide information to the UAV 104, such as approach information, location information, obstacle information, and/or other information. The lights 212 may emit visible light, non-visible light (e.g., infrared light, etc.), or a combination of both.

In some embodiments, the location marker 118 may include a GPS receiver 214 ("GPS") to identify a location of the location marker 118. The GPS 214 may provide coordinates of the location marker to another device, such as via the communication module 128. However, the information from the GPS 214 may include some possible error due to weather and/or other factors. Due to this error and because other location makers may be located near the location marker 118, the location marker 118 may provide visual information to the UAV 104 via the light(s) 212 as discussed herein. The GPS 214 may provide the coordinates to the UAV 104 via a user device and/or via the communication module 128 using communication device 224, either directly to the UAV 104 or via a command center associated with the fulfillment center 102.

The communication device 224 may facilitate communications, under control of the communication module 128, to the UAV 104, to a central command, and/or to a device associated with the recipient 122. The communication device 224 may provide information and/or data via Bluetooth®, Wi-Fi, a mobile telephone network interface, and/or other wired or wireless hardware configured for exchange of data signals. The communication device 224 may be a wireless radio.

In various embodiments, the location marker 118 may include sensors 216, such as one or more of a motion detector 218, a camera 220, and/or a microphone 222. The microphone 222 may be a microphone array, which may enable determining a direction of a sound, among other possible uses of microphone arrays. The sensors 216 may be used by the location marker 118 to detect presence of the UAV 104, presence of obstacles, and/or presence of moving objects, such as people, other vehicles, and animals, and so forth. The sensors 216 may provide input to the light controller 126, which may cause the lights 212 to turn on or off individually to provide information to the UAV 104 and/or to the recipient 122. For example, the light controller 126 may cause lights to flash a predetermined way or in a predetermined pattern to communicate a warning to the UAV and/or the recipient. In some embodiments, the warning messages may be communicated in different ways. The microphone 222 may be used to "hear" the UAV 104 to determine presence of the UAV 104. The microphone 222 may also be used to detect presence of people and/or other living beings (e.g., a barking dog, a bird, etc.).

In various examples, the communication module 128 may receive, via the communication device 224, an initiation signal from the UAV 104 delivering a package, and may provide delivery guidance to the UAV 104 by activating light 212. The light controller 126 may include logic to cause the lights to turn on and off to indicate a delivery location. In various embodiments, the light controller 126 may encode the signal indicating the delivery location to prevent fraud, theft, or spoofing. In such embodiments, the signal may be encoded by pulsing a customer specific code, varying the wavelength of the signal, varying the frequency of the signal, and/or varying the rates of the foregoing.

In some embodiments, the delivery location may be a pre-determined location in proximity to the location marker 118. In other examples, the delivery location may be determined real-time based on the size of the UAV, the size of the package, obstructions present in a pre-determined delivery location and/or other factors.

In various embodiments, the light controller 126 may include logic to receive input from the sensors 216 indicating an obstruction at or proximate to the delivery location. In some embodiments, responsive to the input, the light controller 126 may transmit, via the lights 212, a warning signal to the UAV that it is not clear to deliver the package 108. In some examples, the warning signal may include light-based instructions on where to hold, hover, or land until the delivery area is clear. In other examples, the UAV 104 may have a pre-programmed location to hold, hover, or land in the event that an obstruction is present at the delivery area.

In some embodiments, the detection module 208 may include logic to program the one or more sensors 216 to monitor the delivery area to ensure the obstruction is no longer at or proximate to the delivery location. The one or more sensors 216 may observe the delivery location continuously for a pre-determined time interval, or momentarily after the predetermined time interval has passed, to ensure the obstruction is no longer present. For example, the motion detector 218 may observe the delivery location for 1 minute, and responsive to a lack of motion detected during the 1 minute time interval, the light controller 126 may transmit a message to the UAV 104 via activation of certain lights of the lights 212 that the delivery location is clear to deliver the package 108.

In some examples, responsive to an input that motion is detected in the area continuously or intermittently during the time interval, and/or is detected after the time interval has passed, the light controller 126 may transmit a message to the UAV 104 via light patterns and/or flashing of lights to indicate that the delivery location is obstructed. The message may include an instruction to return to a base location, to fly to a re-charging station, or to continue to hold until a second time interval has passed. In some examples, the location marker 118 may be programmed to execute multiple iterations of time intervals until the obstruction is clear and/or the location marker 118 determines that the UAV is departing or has departed.

In various embodiments, the detection module 208 may include logic to program the one or more sensors 216 to detect an obstacle in an approach path of the UAV (e.g., flight path from an initial position of the UAV 104 to the delivery area). In other embodiments, the detection module 208 may include one or more pre-programmed obstacles proximate to the delivery area. In still yet other examples, the detection module 208 may access obstacle information in the data store 210. In response to a determination that one or more obstacles is present in the approach path and/or proximate to the delivery area, the light controller 126 may cause the lights 212 to transmit a warning of the one or more obstacles to the UAV 104, possibly including location information associated with obstacles (e.g., which side of the location marker the obstacles are near, etc.).

As briefly described above, the location marker 118 can include one or more communication devices 224 for exchanging messages with various customer devices, a UAV, a central delivery system, and/or other networked devices. For example, responsive to verifying the successful delivery of the package, the communication module 128 may send, via the communication device 224, a confirmation message to the customer and/or the central delivery system. For example, the location marker 118 may send a delivery confirmation to the recipient 122 via text message.

In various embodiments, the location marker 118 may be powered by one or more power source 226. In some embodiments, the power source 226 may be one or more batteries. However, the power source 226 may be a power inverter configured to receive power from a power outlet, a solar panel, a wind generator, or other power source.

In some embodiments, the communication module 128 may transmit, via the communication device 224, an indication to the customer and/or the central delivery system of the degraded power system and/or low power available from the one or more batteries. For example, the communication module 128 may send the customer a message that batteries are low. In various embodiments, the indication of the battery power may accompany a message of an upcoming scheduled delivery.

FIGS. 3A-D are schematic diagrams of time sequenced light operations of the location marker with lights. As discussed above, the light controller 126 may cause the lights 212 to individually turn on and off to create a time domain signal sequence, a light pattern, or both. For explanation purposes, the lights 212 are show as a grid of lights. However, other configurations of lights may be used to perform similar operations. As shown throughout the drawings, black squares represent locations of lights turned on (activated) while white or blank locations show lights turned off (not activated).

Figures 3A, 3B, 3C, 3D:
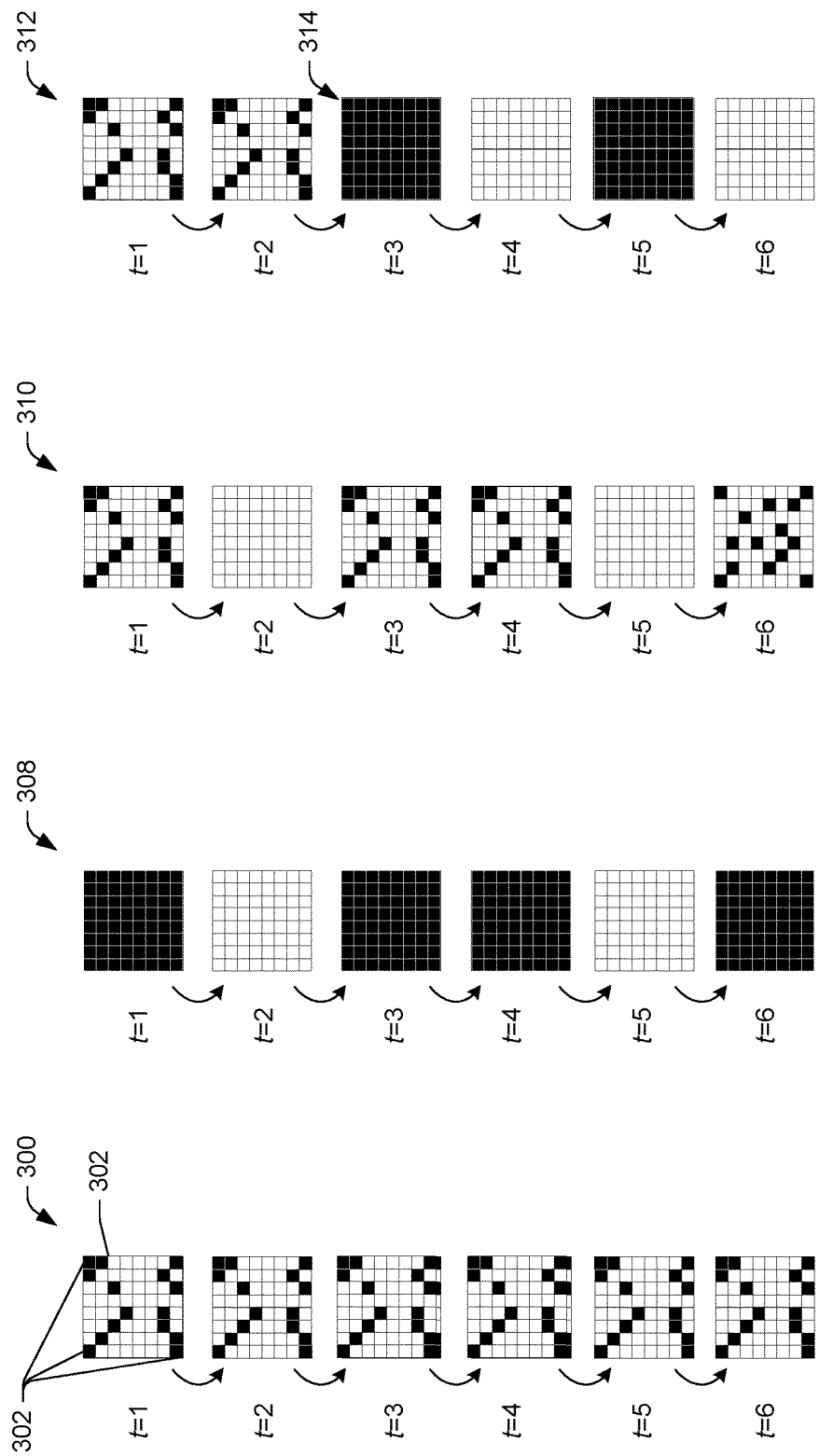
FIGS. 3A-D are schematic diagrams of time sequenced light operations of the location marker with lights.

FIG. 3A shows use of a first light pattern 300. The first light pattern 300 includes a first light configuration where some lights are activated (turned on) while others are not activated (turned off) at a first time (t=1). As shown in FIG. 3A, shaded lights are turned on, such as an interior light 302 within the grid. Bounding lights 304 may be turned on when one or more interior lights are turned on to enable a device to determine a location of the interior light relative to the bounding lights, thus enable reading of a light pattern. The light pattern may be a code, which may be translated into useful information, such as an identifier of the location marker 118 and/or a message. The light pattern may be a result of the lights activated at a time, such as t=1. As shown in FIG. 1A, at t=2, 3, 4, 5, and 6, the light pattern remains active. Thus, the light pattern is provided in this example, but no time domain signal sequence is provided.

FIG. 3B shows a first time domain signal sequence 308 formed by changing lights individually over different times. In FIG. 3B, all lights are shown as being activated at t=1, 3, 4, and 6, and all lights are show as being non-activated at t=2 and 5. This activation of lights may communicate an identifier of the location marker 118 and/or a message or portion thereof assuming more time passes to provide more frames. Each change in light may be consider a frame. Thus, FIG. 3B shows six frames. The length of time a frame is shown and or a time between the frames may provide information to a device, such as a UAV. Thus, the lights may pulse to provide a message, like S-O-S, among many other possible messages.

FIG. 3C shows a first hybrid light signal 310 that includes a time domain signal sequence and a light pattern. The light pattern is "flashed" to provide information of both the light pattern and also other information by the flashing, which provides the time domain signal sequence. The light pattern is provided at t=1, 3, 4, and 6, while the time domain signal sequence is provided by the occurrence of all the frames from t=1 to t=6. Here, the time domain signal sequence may provide an identifier while the light pattern may provide a message, or vice versa, to the UAV 104. In some embodiments, a more critical or important message may be provided by the time domain signal sequence since it may be more perceivable in inclement weather, such as when captured imagery is blurred or otherwise not clear or of high quality to possibly read or be analyzed for the light pattern.

FIG. 3D shows a second light pattern 312 followed by an emergency code 314 that interrupts the light pattern to provide time-sensitive information to the UAV 104. For example, the emergency code 314 may inform the UAV 104 of presence of a person near the location marker 118, a change in weather, a request to abort deposit of the package, and/or provide other information to the UAV 104. The emergency code may terminate when an associated emergency condition has concluded, when appropriate. In some embodiments, the light controller 126 may then cause the lights to emit the light pattern 312 or another arrangement of lights as a light pattern and/or the time domain signal sequence as discussed above.

Figure 4:
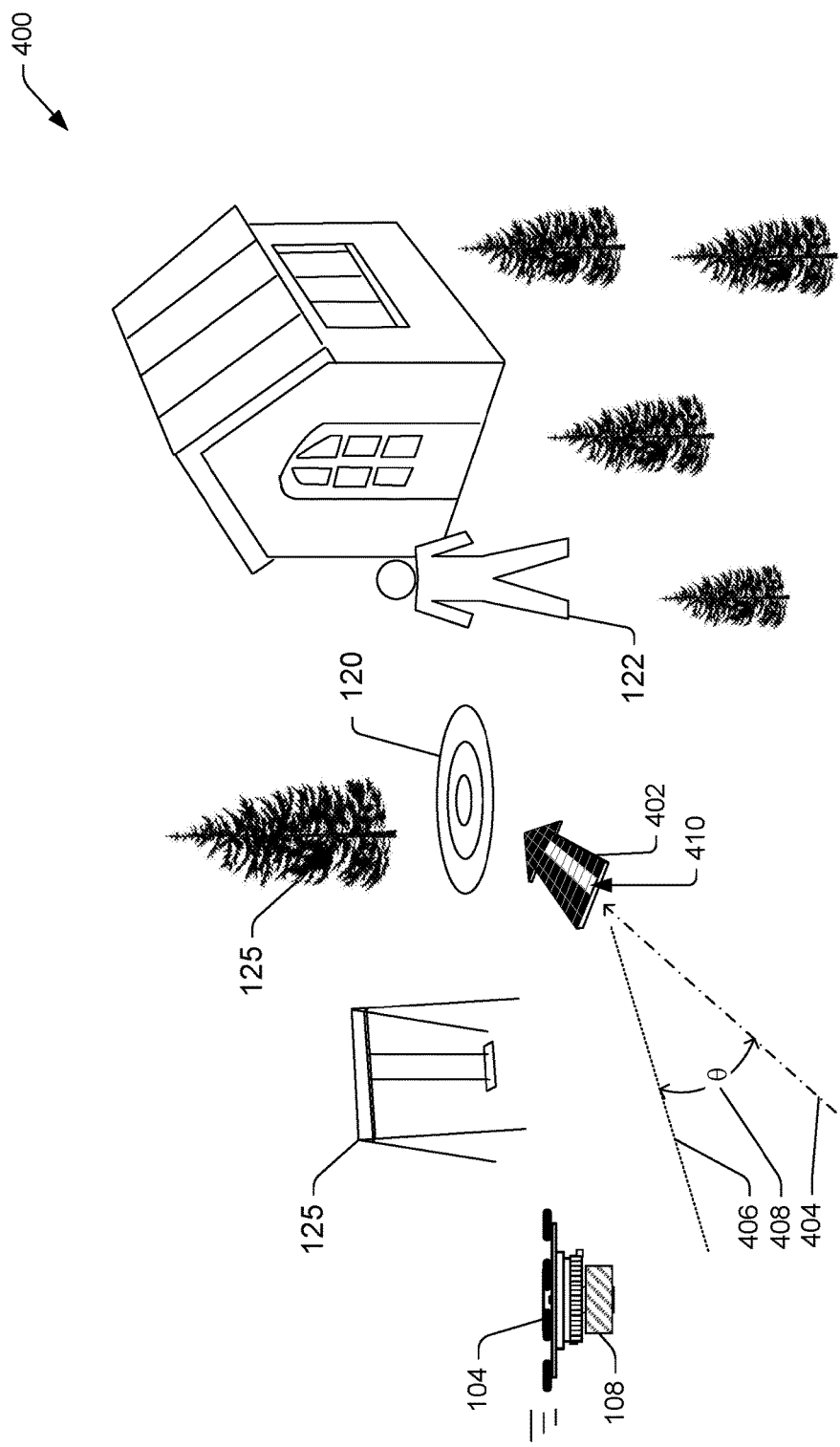
FIG. 4 is a schematic diagram of an environment that includes an illustrative directional location marker with lights configured to visually identify a location for a UAV and at least a direction associated with an approach to the directional location marker.

FIG. 4 is a schematic diagram of an environment 400 that includes an illustrative directional location marker 402 configured to visually identify the location 120 for the UAV 104 to deposit the package 108 and at least a direction associated with an approach to the directional location marker 402.

The directional location marker 402 may include a shape that, when analyzed by the UAV 104 or other device, communicates a direction 404. The direction 404 may be determined determine based on how the recipient 122 places or orients the directional location marker 402. The direction 404 may cause the UAV to determine an approach to the location 120, such as along the direction 404. The direction 404 may be selected to cause the UAV 104 to avoid obstacles 125, such as trees, equipment, animals, and people.

In some embodiments, the directional location marker 402 may emit light as the light pattern and/or as the time domain signal sequence to provide additional information to the UAV 104, such as a glide slope 406 associated with an approach angle θ 408. For example, activation or non-activation of lights may convey the UAV's alignment with the glide slope 406 (e.g., control correction information) or may communicate the angle θ 408 of the glide slope 406. The activation or non-activation of the lights may convey other information, such as a side of the directional location marker 402 nearest an obstacle, and/or other obstacle location information. The activation of lights may change, under control of the light controller 126, as the UAV 104 approaches the directional location marker 402, such as when conditions change, to provide different information, to provide an emergency code, and/or for other reasons.

Figure 5:
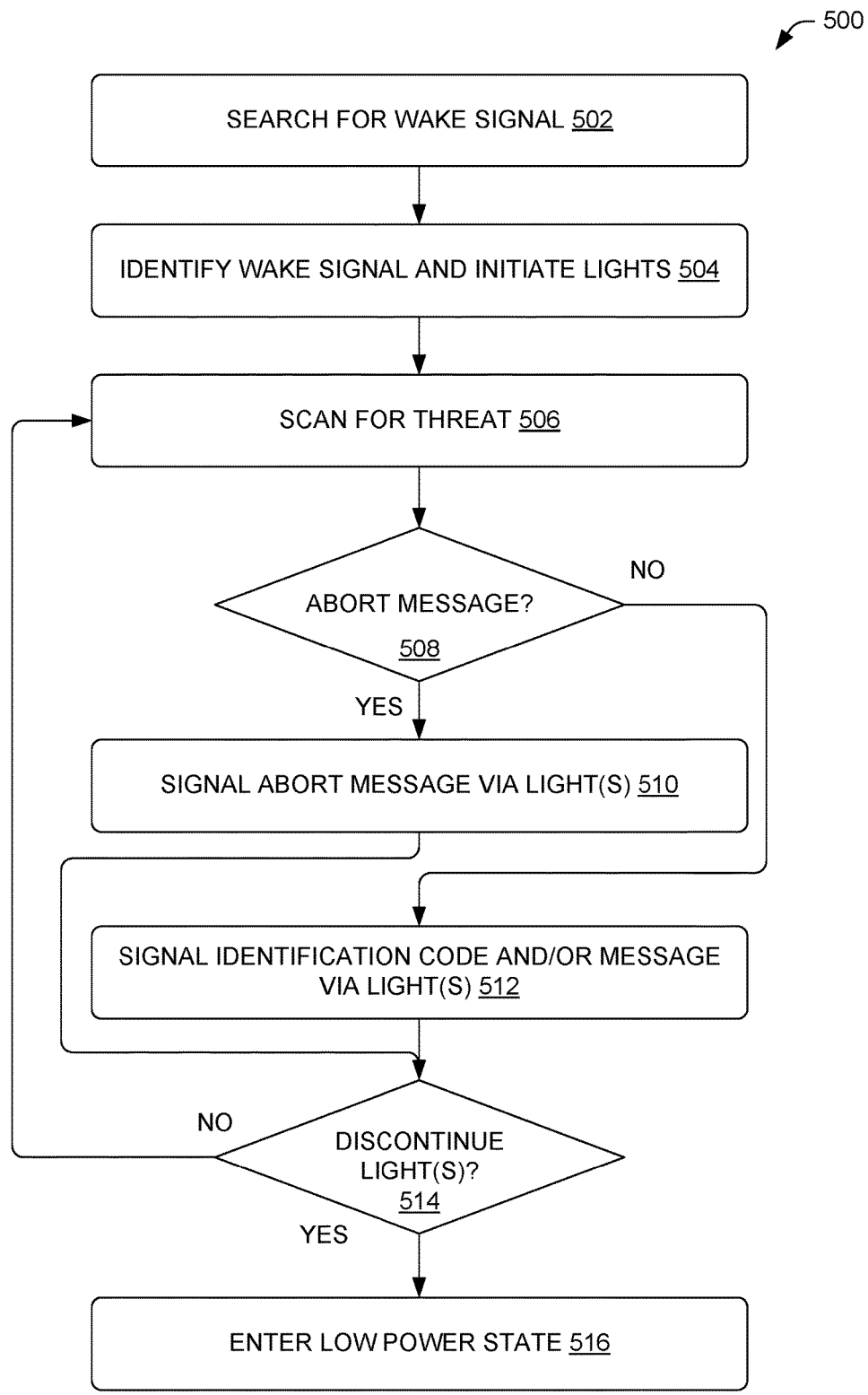
FIG. 5 is a flow diagram of an illustrative process initiate the location marker and provide a light sequence for a UAV.
Figure 6:
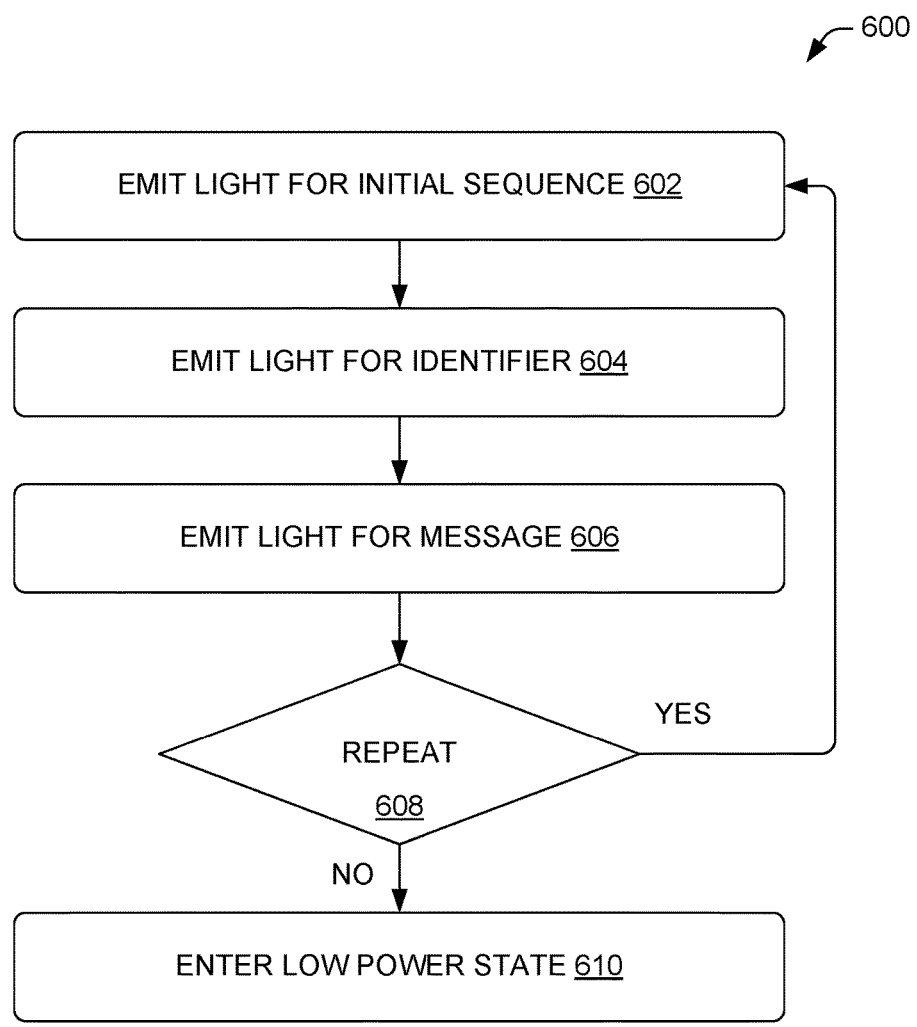
FIG. 6 is a flow diagram of an illustrative process to provide a time domain signal sequence that is readable by a UAV to obtain information associated with a location of the location marker.

FIGS. 5 and 6 are flow diagram of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 initiate the location marker and provide a light sequence for a UAV. The process 500 is described with reference to the environment 100 and the architecture 200. Of course, the process 500 may be performed in other similar and/or different environments.

At 502, the location marker 118 may search for a wake signal. The wake signal may be a signal to cause the light controller 126 to emit light as a light pattern, a time domain signal sequence, or both using a normal power state. The location marker 118 may operate in a low power state while searching for the wake signal. The wake signal may be a sound of the UAV or a sound from the UAV captured by the microphone 222 and processed by the detection module 208. For example, the UAV's rotor blades may emit a unique sound profile or signature that is the wake signal (when processed by the microphone 222). In some embodiments, the wake signal may be a visual of the UAV or a portion thereof captured by the camera 220 and/or the motion detector 218, and processed by the detection module 208. However, the wake signal may be an elapse of time, such that the location marker 118 wakes at a specific time, such as an earliest time the UAV 104 is anticipated to arrive or be in view of the location marker 118. In some embodiments, the wake signal may be a specific signal to wake a specific location marker 118, such that the wake signal includes a unique identifier and/or or other specific information. The wake signal may be provided a user, such as via a user device or a control on the location marker 118. In some embodiments, the communication module 128 may receive the wake signal from the UAV 104, such as via a wireless signal transmitted from the UAV 104.

At 504, the detection module 208 may positively identify the wake signal as one of many possible wake signals discussed above. Upon or after identification of the wake signal, the location marker may change a power setting from a low power state to a normal power state and may initiate lights. For example, the light controller 126 of the location marker 118 may cause the lights 212 to turn on and off individually display an initiate signal or other signal which may be visible to the UAV 104.

At 506, the detection module 208 may scan an area proximate to the location marker 118 to determine if any threats are present that may prevent the UAV 104 for successfully deposing the package 108 on the location 122. For example, the detection module 208 may use the motion detector 218 to determine presence of people, animals, vehicles, and/or other moving objects (e., leaves on a tree, a flag on a flagpole, clothes on a clothes line, etc.). The detection module 208 may use the camera 220 or other image sensor to identify other obstacles near the location marker 118, such as trees, a swing set, and/or other obstacles.

At 508, the light controller 126, based on information from the detection module 208 gathered at the operation 506, may determine whether to emit an abort message or other emergency message via the lights 212. The abort message or other emergency message may be signaled by predetermined light pattern, a predetermined time domain signal sequence, or both. When the light controller 126 determines to emit the abort message or other emergency message (following the "yes" route from the decision operation 508), then the process 500 may advance to an operation 510. At 510, the light controller 126 may cause the lights 212 to turn on and off to emit the abort message or other emergency message via at least one of the predetermined light pattern or the predetermined time domain signal sequence.

Returning to the decision operation 508, when the light controller 126 determines not to emit the abort message or other emergency message (following the "no" route from the decision operation 508), then the process 500 may advance to an operation 512. At 512, the light controller 126 may cause the lights 212 to turn on and off to signal an identification of the location marker 118 and/or a message via at least one of the predetermined light pattern or the predetermined time domain signal sequence. For example, the light pattern may provide a message while the time domain signal sequence may provide the identification of the location marker 118 as being associated with a specific person, such as the recipient 122. However, the light pattern may provide the identification while the time domain signal sequence may provide the message, in some instances.

Following either operation 510 or 512, the process 500 may advance to a decision operation 514 to determine whether to discontinue the lights and to enter the low power state. For example, the light controller 126 may receive a signal from the detection module 208 that the package 108 has been deposited, the UAV 104 has departed the area, and/or other event information. In some embodiments, the light controller 126 may determine to discontinue the lights after a predetermined amount of time (e.g., 3 minutes, 30 minutes, etc.), or in response to user input. The signal may be provided by a user, such as via a user device or a control on the location marker 118 to discontinue the lights. This control may prevent unauthorized use of the location marker 118.

When the light controller 126 determines not to discontinue the lights (following the "no" route from the decision operation 514), then the process 500 may advance to the operation 506 and continue with the process 500 as described above. When the light controller 126 determines to discontinue the lights (following the "yes" route from the decision operation 514), then the process 500 may advance to an operation 516. At 516, the light controller 126 may discontinue turning the lights on and the location marker 118 may enter a low power state.

FIG. 6 is a flow diagram of an illustrative process 600 to provide a time domain signal sequence that is readable by a UAV to obtain information associated with a location of the location marker. The process 600 is described with reference to the environment 100 and the architecture 200. Of course, the process 600 may be performed in other similar and/or different environments.

At 602, the light controller 126 may cause the lights 212 to turn on and off to emit light to provide an initial light sequence of a light pattern and/or a time domain signal sequence. The initial sequence may inform the UAV 104 and/or another device that an identifier will be provided by the light controller 126 following the initial light sequence.

At 604, the light controller 126 may cause the lights 212 to turn on and off to emit light to provide an identifier associated with the location device and/or the recipient. The identifier may be provided via a light pattern and/or a time domain signal sequence. The light controller 126 may emit the identifier immediately after the initial sequence or after a delay.

At 606, the light controller 126 may cause the lights 212 to turn on and off to emit light to provide a message associated with the location device and/or the recipient. The message may be provided via a light pattern and/or a time domain signal sequence. The light controller 126 may emit the message immediately after the identifier or after a delay. In some embodiments, the message may be provided before the identifier. As described above, the operations 604 and 606 may be performed in parallel when the identifier and the message are provided by the time domain signal sequence and light pattern, respectively, or vice versa.

At 608, the light controller 126 may determine whether to repeat the identifier, the message, or both. For example, the light controller 126 may receive information from the communication module 128 and/or the detection module 208 to determine whether to repeat the identifier and/or the message, such as based on whether the UAV is still present and/or other information. The light controller 126 may determine whether to repeat the identifier, the message, or both based on a duration of time of operation of the process 600 and/or a number of iterations of the process 600.

When the light controller 126 determines to repeat the identifier, the message, or both (following the "yes" route from the decision operation 608), then the process 600 advances to the operation 602 and the process 600 may continue as described above. When the light controller 126 determines not to repeat the identifier, the message, or both (following the "no" route from the decision operation 608), then the process 600 advances to an operation 610. At 610, the light controller 126 may discontinue turning the lights on and the location marker 118 may enter a low power state.

Figure 7:
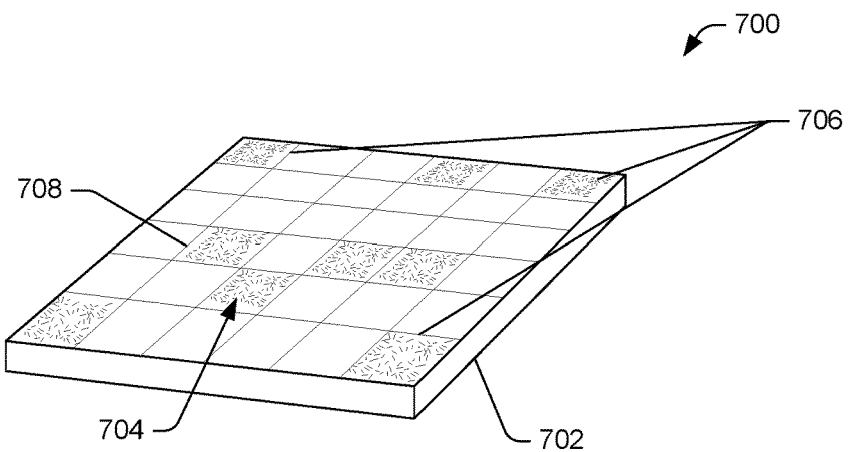
FIG. 7 is a perspective view of an illustrative location marker that includes retroreflectors.

FIG. 7 is a perspective view of an illustrative location marker 700 that includes retroreflectors. The location marker 700 may include a housing 702, which may a generally flat shape or a three-dimensional shape such as a cylinder, a pyramid, a cube, or other three-dimensional shape. The location marker 700 may include at least one surface that includes retroreflectors 704, which reflect at least some light from a given direction back to that direction. The retroreflectors may be formed using conventional techniques, such as those used to create retroreflectors on traffic signs. However, the retroreflectors 704 may be laid out on the housing 702 in a grid, an array, or other pattern or configuration which can be read by a device, such as the UAV 104 to determine an identifier and/or a message. The identifier may be a unique identifier associated with a person, an identifier of a limited set of identifiers (e.g., 1-99, A-Z, etc.), and/or an identifier that identifies the device as a location marker.

The location marker 700 may include retroreflectors at bounding locations 706 to provide a bounds for possible locations of the retroreflectors on the location marker 700. For example, the bounding locations 706 may be corners of a square or a perimeter or part of a perimeter of a circle.

Interior retroreflector locations 708 may form a pattern or configuration which can be read by a device, such as the UAV 104 to determine an identifier and/or a message. For example, the retroreflectors may be arranged to form a QR code or other image code. In some embodiments, the location marker 700 may enable a UAV to distinguish a delivery location from a nearby delivery location, even when the delivery locations in close proximity (within 10 feet or less) based on unique patterns of groupings of the retroreflectors located on the location marker 700.

In some embodiments, at least one of the plurality of retroreflectors may be movable relative to a housing that secure placement of the retroreflectors. For example, the retroreflectors may removable couple to a grid or other features on a housing to enable a user to reconfigure a pattern formed by the retroreflectors. By reconfiguring the pattern, users can customize the pattern to provide different information, such as different identifier information, information about obstacles, information to guide an approach of the UAV 104, and/or other information. The user may determine a pattern using a reference, such as a website or printed documentation, which may guide the user's create of patterns readable by the UAV 104 and/or by other devices. The retroreflectors may slide into different locations, couple and decouple, or otherwise be moveable relative to the housing.

Figure 8:
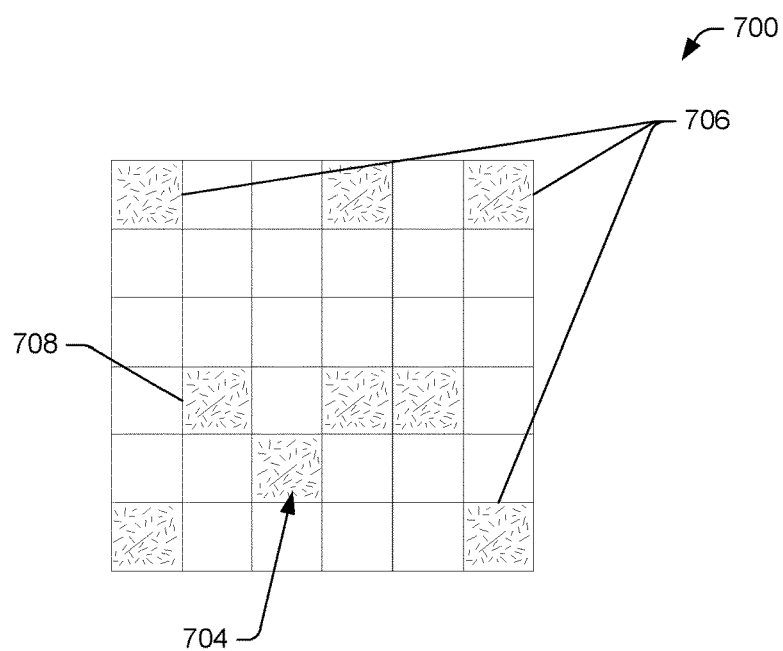
FIG. 8 is a top side view of the illustrative location marker that includes retroreflectors shown in FIG. 7.

FIG. 8 is a top side view of the illustrative location marker 700 that includes retroreflectors shown in FIG. 7. As shown in FIG. 8, the retroreflectors may be aligned on a grid, however other arrangements may be used to lay out the retroreflectors. The pattern formed by the retroreflectors may be symmetrical or may be non-symmetrical, depending on the algorithm used to generate and/or read the patterns to convert the location of individual groups of retroreflectors (e.g., small squares or other groups of retroreflectors, etc.) into meaningful information, such as an identifier or a message. In some embodiments, the location of the groups of retroreflectors may provide directionality information, which is further explained below. The directionality may be used to indicate an approach route to the location marker and/or a departure route from the location marker, presence and/or locations of obstacles, and/or other information.

Figure 9:
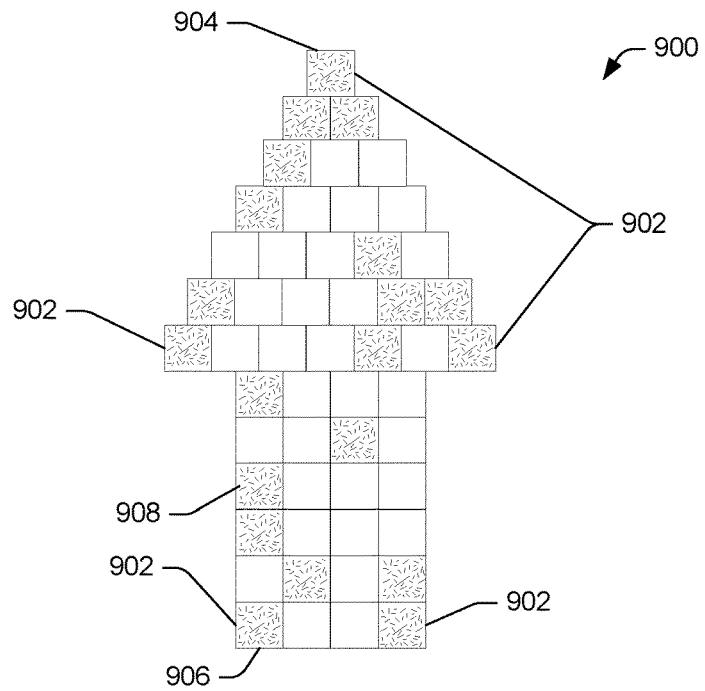
FIG. 9 is a top side view of an illustrative directional location marker.

FIG. 9 is a top side view of an illustrative directional location marker 900. The directional location marker 900 may include retroreflectors located at bounding locations 902, which when identified by the UAV 104 or by another device, may enable the UAV 104 or other device to distinguish a first end 904 from a second end 906. By distinguishing the first end 904 from the second end 906, the UAV 104 or other device may infer directionality, which may be used to provide information to the UAV 104 or other device. For example, the directionality may be used to indicate an approach route to the location marker and/or a departure route from the location marker, presence and/or locations of obstacles, and/or other information. Other groups of retroreflectors 908 may be present on the directional location marker 900 and may be used to provide an identifier and/or a message to the UAV 104 and/or other device. Thus, the directional location marker 900 may provide information such as a unique identifier, an approach angle, an approach direction, and/or other information based on the shape of the directional location marker bounded by the bounding locations 902 and by locations of the groups of retroreflectors 908 on the directional location marker 900. In various embodiments, the directional location marker 900 may enable a UAV to distinguish a delivery location from a nearby delivery location, even when the delivery locations in close proximity (within 10 feet or less) based on unique patterns of groupings of the retroreflectors located on the directional location marker 900.

Figure 10:
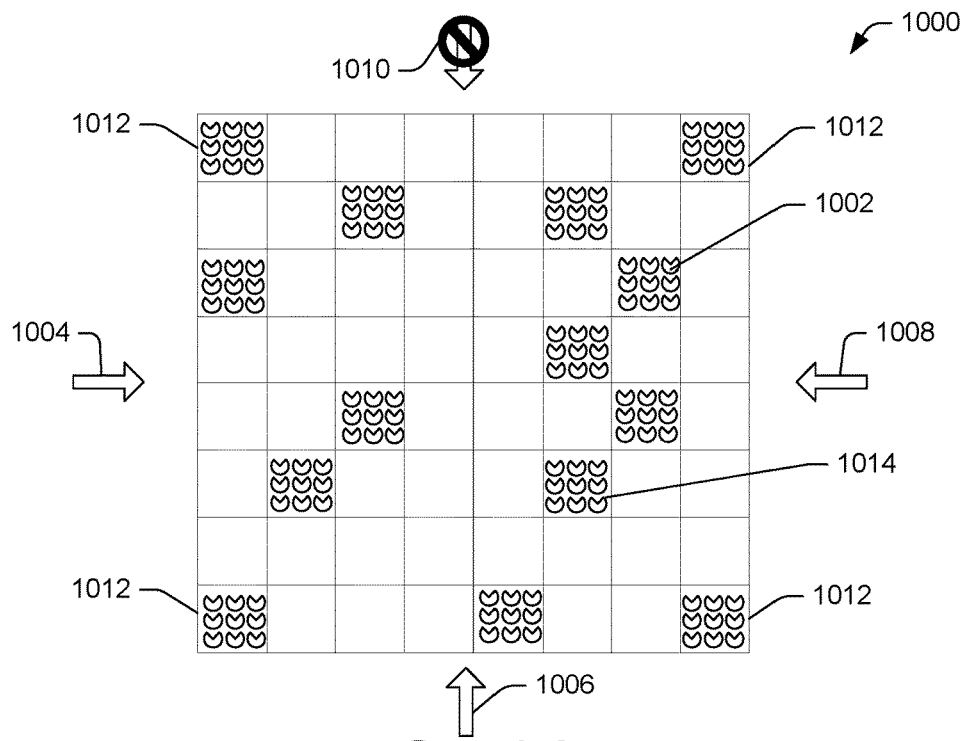
FIG. 10 is a top side view of an illustrative location marker that reflects light to create a field of view of less than 360 degrees.

FIG. 10 is a top side view of an illustrative location marker 1000 that reflects light to create a field of view of less than 360 degrees. The location marker 1000 may include retroreflectors 1002 that reflect light in some directions but not all directions. For example, light from a first direction 1004, a second direction 1006, or a third direction 1008 may be reflected back to the source of the light. However, based on the layout and/or design of the retroreflectors 1002, light from a fourth direction 1010 may not be reflected back to the source of the light. The angle where light is not directed back to the source of light may be selected based on design requirements, and may vary based on location markers. A recipient may request a location marker 1000 with a specific angle where light is not reflected back for various reasons. For example, the UAV 104 may not detect the retroreflectors when approaching from the fourth direction 1010, which may provide the UAV 104 with information about the location of the delivery location, the recipient, the identifier, obstacles, an approach direction, a departure direction, and/or other information. As an example, the location marker 1000 may be placed by a recipient in such a way that the UAV would not detect the location marker from the fourth direction and the fourth direction may be purposely aligned with a path that intersects or nearly intersects an obstacle that the recipient desires the UAV to avoid, such as a chicken coop or other obstacle. The design of the retroreflector 1002 shown in FIG. 10 is for explanation purposes. The actual design of directional retroreflectors is understood to be known by those with skill in the art of manufacture and design of retroreflectors. Like the location marker 700, the location marker 1000 includes retroreflectors in bounding locations 1012, as well as groups of retroreflectors 1014 that create a readable identifier and/or message.

Figure 11:
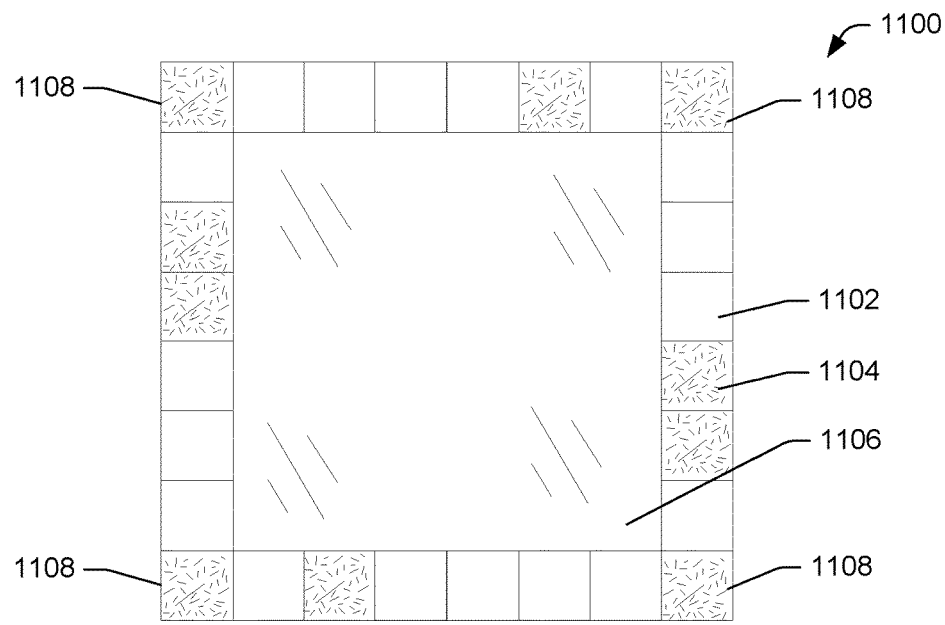
FIG. 11 is a top side view of an illustrative location marker that includes retroreflectors and a secondary display area.

FIG. 11 is a top side view of an illustrative location marker 1100 that includes a first area 1102 with groups of retroreflectors 1104 and a secondary area 1106 that may be a display area. The second area may include a static display, such as a graphic, or a movable display, such as a liquid crystal display, an organic LED display, an electronic ink display, and/or any other type of display that may be used to convey information to people and/or other devices via image capture using image sensors. For example, the display may create a bar code or other scannable code (e.g., a QR code or other type of fiducial) that can be captured by the UAV as the UAV passes close to the location marker 1100. The arrangement of the groups of retroreflectors 1104 in the first area 1102 may provide an identifier and/or a message readable by the UAV 104 or another device. Like the location marker 700, the location marker 1100 includes retroreflectors in bounding locations 1108, as well as the groups of retroreflectors 1104 that create a readable identifier and/or message.

Figure 12:
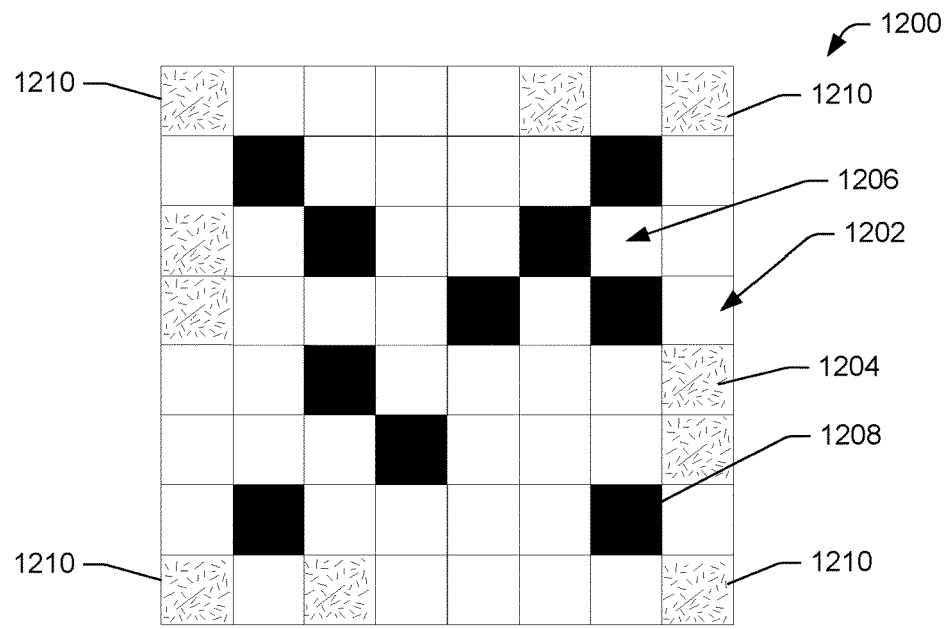
FIG. 12 is a top side view of an illustrative location marker that includes retroreflectors and lights.

FIG. 12 is a top side view of an illustrative location marker 1200 that includes a first area 1202 with groups of retroreflectors 1204 and a second area 1206 that includes lights 1208. The lights 1208 in the second area 1206 may be under control of the light controller 126 described above, and may operate as discussed above with reference to FIGS. 1-6. Thus, the lights may individually be turned on and off at times to create a light pattern and/or to provide a time domain signal sequence. The retroreflectors may provide the same information as the lights or the retroreflectors may be used to provide different information. For example, the retroreflectors may provide directionality information while the lights may provide an identifier and/or a message when read by the UAV 104 or another device. However, the arrangement of the groups of retroreflectors 1104 in the first area 1202 may provide an identifier and/or a message readable by the UAV 104 or another device. Like the location marker 700, the location marker 1100 includes retroreflectors in bounding locations 1210, as well as the groups of retroreflectors 1204 that create a readable identifier and/or message, or other information.

Figures 13A, 13B:
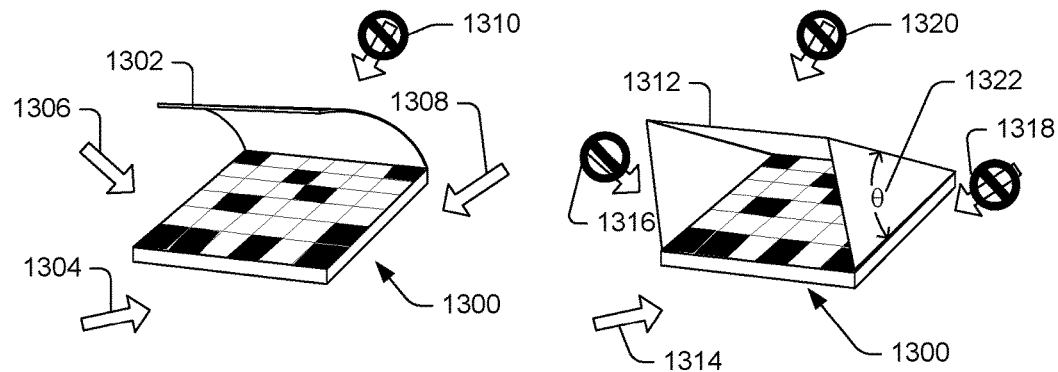
FIGS. 13A-13B are top side views of illustrative location markers that include hoods that hide at least a portion of the markers from certain viewing angles.

FIGS. 13A-13B are top side views of illustrative location markers that include hoods that hide at least a portion of the markers from certain viewing angles. FIG. 13A shows a perspective view of an illustrative location marker 1300 that includes a simple hood 1302 that may block view of one or more lights (or retroreflectors) included on the location marker when viewed from a particular area. Multiple hoods may be used to block a view form an area, such as a hood for each light, each group of retroreflectors (e.g., each pixel). However, a single hood may also be used for the whole location marker. As shown, the location marker 1300 may be viewable from a first direction 1304, a second direction 1306, and a third direction 1308. However, the presence of the simple hood 1302 may block view of the location marker 1300 from a fourth direction 1310. By blocking the view for a direction, the location marker 1300 may prevent a vehicle from approaching form that direction, area, or angle, or may otherwise communicate information to the vehicle regarding this area/direction where the lights and/or retroreflectors of the location marker 1300 are not fully visible. As an example, the use of the hood may cause the UAV 104 to approach from one of the directions other than the fourth direction 1310.

FIG. 13B shows a perspective view of an illustrative location marker 1300 that includes a full hood 1312 that may block view of one or more lights (or retroreflectors) included on the location marker when viewed from a particular area. Multiple hoods may be used to block a view form an area, such as a hood for each light, each group of retroreflectors (e.g., each pixel). However, a single hood may also be used for the whole location marker. As shown, the location marker 1300 may be viewable from a first direction 1304. However, the presence of the full hood 1312 may block view of the location marker 1300 from a second direction 1316, a third direction 1318, and a fourth direction 1320. By blocking the view for multiple directions, the location marker 1300 may prevent a vehicle from approaching form those directions, areas, or angles, or may otherwise communicate information to the vehicle regarding these areas/directions where the lights and/or retroreflectors of the location marker 1300 are not fully visible. As an example, the use of the full hood 1312 may cause the UAV 104 to approach from first direction 1314, which may cause the UAV 104 to avoid obstacles. An angle θ 1322 of the full hood 1312 may be used to communicate a maximum glide slope to the UAV.

The hoods shown in FIGS. 13A and 13B may be used with any other embodiment described herein, including embodiments that use lights, retroreflectors, or both. Other hood designs are contemplated which block view of at least a portion of the lights and/or retroreflectors of the location markers to achieve a design consideration. The hoods may provide additional benefits besides blocking the lights from view from certain angles. Additional benefits may include protecting the location marker from weather (e.g., rain, snow, etc.) and reducing emission of stray light to appease neighbors, for example.

Figure 14:
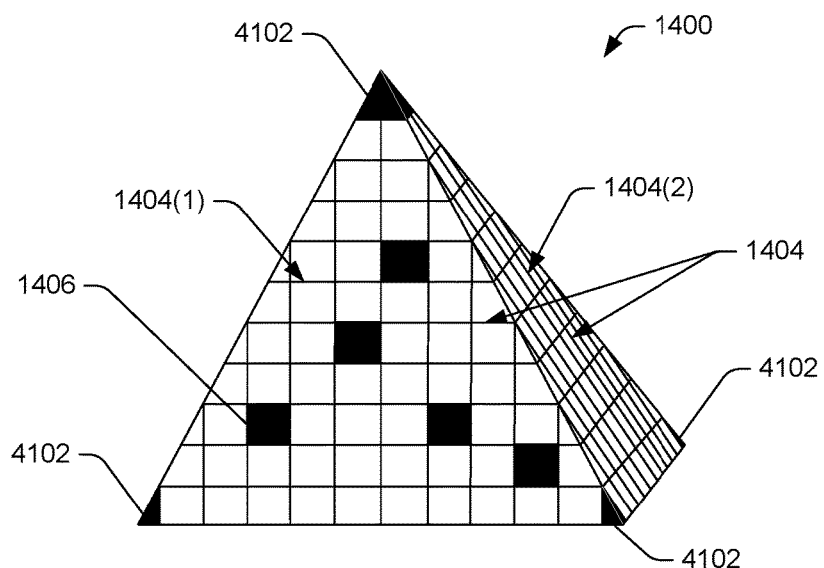
FIG. 14 is a perspective view of an illustrative three-dimensional location marker.

FIG. 14 is a perspective view of an illustrative three-dimensional location marker 1400. The three-dimensional location marker 1400 may include lights and/or retroreflectors at bounding locations 1402, which may enable the UAV 104 or another device to determine a boundary of at least a side of the three-dimensional location marker 1400. The three-dimensional location marker 1400 may be formed from virtually any shape, including cylindrical shapes, pyramids, cubes, and/or other three-dimensional shapes which enable a view of lights and/or retroreflectors from a wide range of angles or locations around the three-dimensional location marker 1400. In some embodiments, the three-dimensional location marker 1400 may include sides 1404, such as a first side 1404(1), a second side 1404(2), and so forth. Each side may display a same pattern and/or time domain signal sequence, or some sides may display different patterns and/or time domain signal sequence. Interior lights or grouping of retroreflectors 1406 may be used to provide the same pattern (for lights and/or retroreflectors) and/or time domain signal sequence (for lights).

Figure 15:
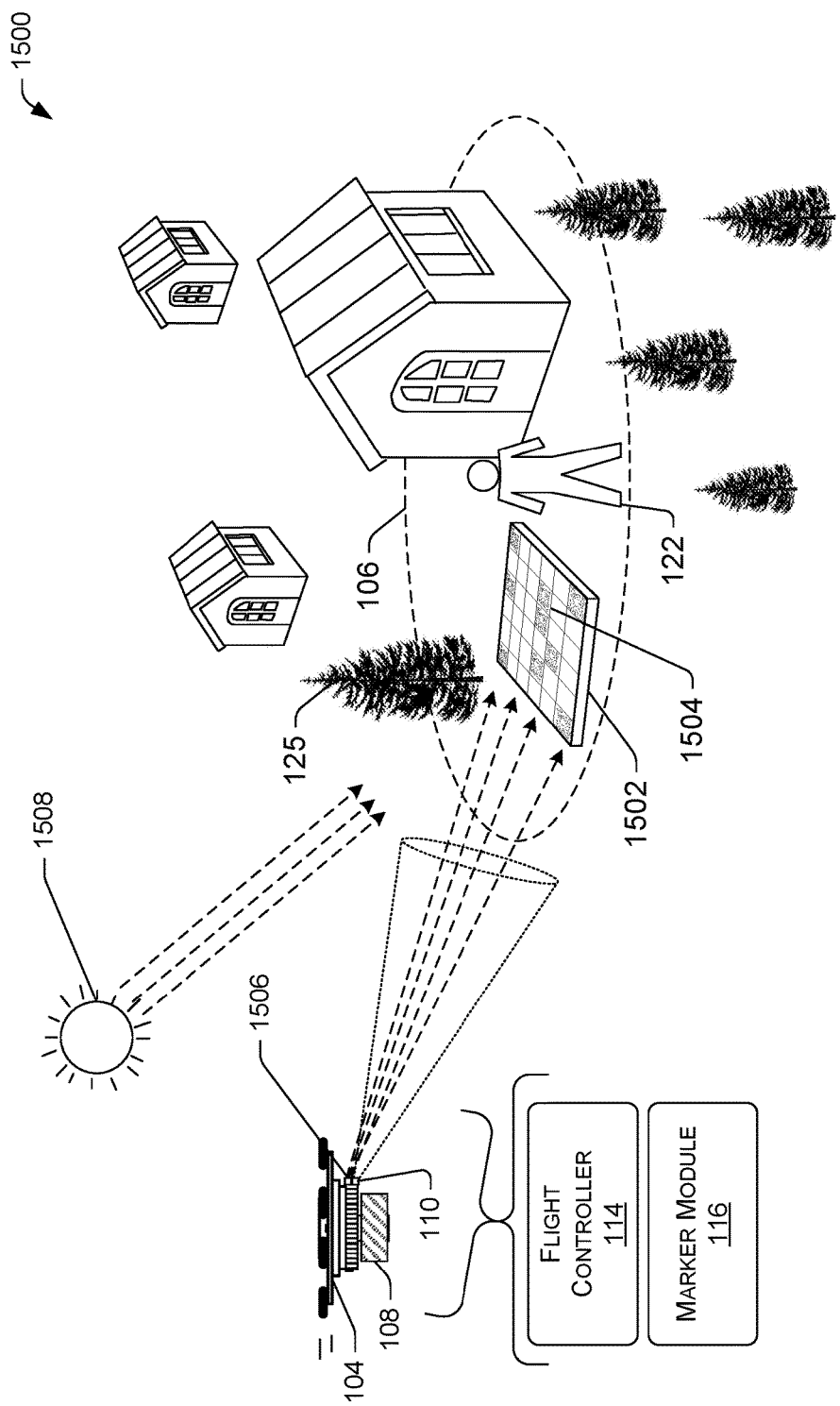
FIG. 15 is a schematic diagram of an environment that includes an illustrative directional location marker with retroreflectors and a UAV to locate the location marker.

FIG. 15 is a schematic diagram of an environment that includes an illustrative directional location marker 1500 with retroreflectors and a UAV to locate the location marker. The environment 1500 is similar as the environment 100 described with reference to FIG. 1, except FIG. 15 shows a location marker 1502 as including retroreflectors. Thus, the location marker 1502 may be similar to the location marker 700 or other location markers described above that include or can include retroreflectors.

To identify the location marker 1502 and read information based on a pattern of groupings of retroreflectors 1504, light is directed to the location marker 1502. The light may be directed from a light source 1506 onboard a vehicle, such as onboard the UAV 104. However, external light sources may also be used to cause light to be reflected from the retroreflectors and back to the UAV 104 or other device. For example, the retroreflectors may reflect sunlight from the sun 1508, which may be captured by image sensors 110 of the UAV 104. In some embodiments, the marker module 116 may control the light source 1506 and/or direction of the light source to enable the light sensors 110 to capture light reflected back to the UAV from the retroreflectors of the location marker 1502. In various embodiments, the flight controller 114, via inputs from the marker module 116, may approach the location marker 1502 at an angle relative to the angle of the sun 1508 with respect to the location marker 1502 such that the sunlight is reflected to the UAV 104 for capture by the image sensors 110. In the latter scenario that uses the sunlight, the light source 1506 may not be used.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus, comprising:
a plurality of lights;
one or more sensors to identify a presence of an obstacle; and
a light controller to:
encode first information into a first time domain signal sequence and to cause the plurality of lights to turn on and off to output at least the first time domain signal sequence via light emitted from the plurality of lights, the first time domain signal sequence readable by a vehicle that is in view of the plurality of lights to communicate the first information to the vehicle, the first information comprising at least one of a first location identifier associated with a first location of the apparatus, a first indication of the presence of the obstacle, or a second indication of a location of the obstacle; and
encode second information into a second time domain signal sequence, the second information comprising at least a second location identifier associated with a second location of the apparatus.

2. The apparatus as recited in claim 1, wherein the first information further comprises an instruction to the vehicle to temporarily hold a position.

3. The apparatus as recited in claim 1, wherein the light controller causes the plurality of lights to communicate the first location identifier using the first time domain signal sequence and causes the plurality of lights to communicate a message via a light pattern, the message being at least partially different than the first location identifier.

4. The apparatus as recited in claim 1, further comprising a communication device configured to receive the first location identifier from a device.

5. The apparatus as recited in claim 1, wherein the one or more sensors comprise a proximity sensor to detect at least object movement proximate to the apparatus, and wherein the light controller causes at least some of the plurality of lights to turn on to create a predetermined pattern or flashing sequence in response to receipt of a signal from the proximity detector generated in response to detection of at least the object movement.

6. The apparatus as recited in claim 1, wherein the light controller provides approach information to an unmanned aerial vehicle (UAV) moving toward the plurality of lights.

7. The apparatus as recited in claim 1, further comprising a plurality of retroreflectors arranged about a surface that includes the plurality of lights to form a pattern, the pattern readable to extract at least one of a message or the first location identifier.

8. The apparatus as recited in claim 1, further comprising a housing including a directional shape, and wherein the light controller illuminates at least some of the plurality of lights that bound the directional shape to enable a device to determine the directional shape.

9. The apparatus as recited in claim 1, further comprising a power source, wherein the power source is configured to power the light controller in a low power state at a first time and power the light controller in a normal power state at a second time when the light controller activates at least some of the plurality of lights, wherein the apparatus consumes more power during operation in the normal power state than during operation in the low power state.

10. The apparatus as recited in claim 9, wherein the light controller enters the normal power state in response to a signal that indicates a presence of an unmanned aerial vehicle (UAV), the signal generated by at least one of a microphone or an imaging device that identifies the UAV.

11. A method comprising:
receiving first information encoded into a first time domain signal sequence;
controlling a plurality of lights of a device through a light controller to turn on and off at least some of the plurality of lights;
sequencing at least some of the plurality of lights on and off to create the first time domain signal sequence readable by a vehicle;
activating individual lights of the plurality of lights to form a light pattern readable by the vehicle, wherein at least one of the first time domain signal sequence or the light pattern are configured to communicate a first location identifier associated with a first location of the device to the vehicle;
receiving second information encoded into a second time domain signal sequence; and
sequencing at least some of the plurality of lights on and off to create the second time domain signal sequence, the second time domain signal sequence configured to communicate a second location identifier associated with a second location of the device.

12. The method as recited in claim 11, wherein at least one of the first time domain signal sequence, the second time domain signal sequence, or the light pattern comprises an emergency code to cause the vehicle to refrain from approaching a specific location.

13. The method as recited in claim 11, further comprising identifying a presence of the vehicle prior to performing the sequencing or the activating.

14. The method as recited in claim 11, further comprising terminating the sequencing or the activating in response to at least one of a passage of a duration of time, a completion of predetermined number of iterations of the first time domain signal sequence or the second time domain signal sequence, or a wireless signal initiated by a user.

15. The method as recited in claim 11, further comprising:
detecting at least one obstacle proximate to the plurality of lights, and wherein at least one of the first time domain signal sequence, the second time domain signal sequence, or the light pattern includes an indication of the at least one obstacle.

16. The method as recited in claim 11, further comprising communicating the first information or the second information to an electronic device in view of the plurality of lights.

17. The method as recited in claim 11, further comprising communicating third information via the time domain signal sequence to the vehicle; and
communicating fourth information via the light pattern to the vehicle, wherein the third information is at least partially distinct from the fourth information.

18. A system, comprising:
a plurality of lights;
a light controller to encode first information into a first time domain signal sequence and second information into a second time domain signal sequence, the light controller causing the plurality of lights to turn on and off to output at least one of a light pattern, the first time domain signal sequence, or the second time domain signal sequence via light emitted from the plurality of lights, wherein the first time domain signal sequence and the second time domain signal sequence are readable by a vehicle in view of the plurality of lights to communicate the information to the vehicle, wherein the first information comprises a first location identifier associated with a first location of the light controller and the second information comprises a second location identifier associated with a second location of the light controller; and
a vehicle sensor configured to process at least one of the time domain signal sequence or the light pattern.

19. The system as recited in claim 18, wherein the first location identifier includes an address of a delivery location.

20. The system as recited in claim 18, wherein the vehicle is an unmanned aerial vehicle (UAV), and wherein the light controller provides approach information to the UAV moving toward the plurality of lights.

* * * * *